United States Patent
Townsend et al.

(10) Patent No.: US 10,161,957 B2
(45) Date of Patent: Dec. 25, 2018

(54) ACCELEROMETERS

(71) Applicant: Atlantic Inertial Systems Limited, Plymouth, Devon (GB)

(72) Inventors: Kevin Townsend, Liskeard (GB); Michael Terence Durston, Plymouth (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 54 days.

(21) Appl. No.: 15/126,807

(22) PCT Filed: Mar. 17, 2015

(86) PCT No.: PCT/GB2015/050778
§ 371 (c)(1),
(2) Date: Sep. 16, 2016

(87) PCT Pub. No.: WO2015/140537
PCT Pub. Date: Sep. 24, 2015

(65) Prior Publication Data
US 2017/0089947 A1  Mar. 30, 2017

(30) Foreign Application Priority Data
Mar. 17, 2014 (GB) .................................. 1404720.3

(51) Int. Cl.
*G01P 15/125* (2006.01)
*G01P 15/13* (2006.01)
(Continued)

(52) U.S. Cl.
CPC .......... *G01P 15/131* (2013.01); *G01P 15/125* (2013.01); *G01P 21/00* (2013.01); *G01P 2015/0814* (2013.01)

(58) Field of Classification Search
CPC .................................................... G01P 15/131
See application file for complete search history.

(56) References Cited

U.S. PATENT DOCUMENTS 6,105,428 A  8/2000  Schmiesing et al.
2006/0112765 A1*  6/2006  Malvern ................. G01P 1/006
73/514.32
(Continued)

FOREIGN PATENT DOCUMENTS

EP  0338688 A1  10/1989
EP  0369352 A1   5/1990
(Continued)

OTHER PUBLICATIONS

GB Search Report for Application No. GB1404720.3. dated Aug. 20, 2014. 3 Pages.
(Continued)

*Primary Examiner* — Clayton E LaBalle
*Assistant Examiner* — Dennis Hancock
(74) *Attorney, Agent, or Firm* — Cantor Colburn LLP

(57) ABSTRACT

A method for closed loop operation of a capacitive accelerometer comprising: a proof mass; first and second sets of both fixed and moveable capacitive electrode fingers, interdigitated with each other; the method comprising: applying PWM drive signals to the fixed fingers; sensing displacement of the proof mass and changing the mark:space ratio of the PWM drive signals, to provide a restoring force on the proof mass that balances the inertial force of the applied acceleration and maintains the proof mass at a null position; detecting when the mark:space ratio for the null position is beyond a predetermined upper or lower threshold; and further modulating the PWM drive signals by extending or reducing x pulses in every y cycles, where x>1 and y>1, to provide an average mark:space ratio beyond the upper or lower threshold without further increasing or decreasing the mark length of the other pulses.

15 Claims, 7 Drawing Sheets

(51) Int. Cl.
  *G01P 21/00* (2006.01)
  *G01P 15/08* (2006.01)

(56) References Cited

U.S. PATENT DOCUMENTS

2007/0028689 A1 2/2007 Vrcelj
2012/0116707 A1 5/2012 Malvern

FOREIGN PATENT DOCUMENTS

| EP | 1072893 A1 | 1/2001 |
| JP | H0775385 A | 3/1995 |
| WO | 2004076340 A1 | 9/2004 |
| WO | 2005083451 A1 | 9/2005 |
| WO | 2012076837 A1 | 6/2012 |
| WO | 2013050752 A1 | 4/2013 |

OTHER PUBLICATIONS

Notification of Transmittal of the International Search Report and the Written Opinion of the International Searching Authority, or the Declaration; PCT/GB2015/050778; dated May 26, 2015.
JP Office Action for Application No. JP 2016-557879, dated Jul. 17, 2018, 5 pages (Original).
JP Office Action for Application No. JP 2016-557879, dated Jul. 17, 2018, 5 pages (Translation).

\* cited by examiner

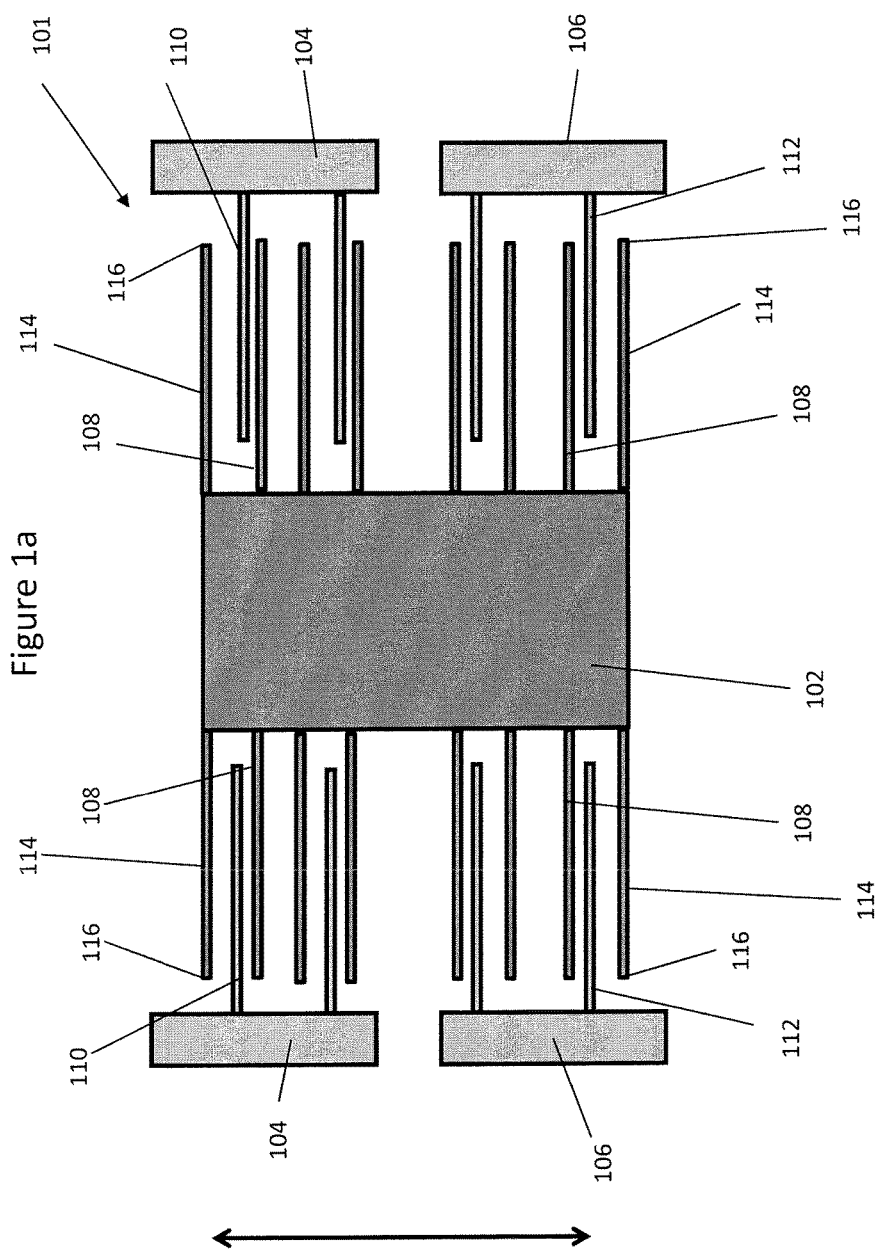

| Over-Range State | PWM mark length for each cycle | | | | Average mark:space ratio (%) | Comment |
|---|---|---|---|---|---|---|
| | 0 | 1 | 2 | 3 | | |
| 0 | 50% | 50% | 50% | 50% | 50:50 | Normal Operation |
| 1 | 10% | 10% | 10% | 10% | 10:90 | Limit of Normal Operation |
| 2 | 0% | 10% | 10% | 10% | 7.5:92.5 | Recovery mode |
| 3 | 0% | 10% | 0% | 10% | 5:95 | Recovery mode |
| 4 | 0% | 0% | 0% | 10% | 2.5:97.5 | Recovery mode |

| Over-Range State | PWM mark length for each cycle | | | | Average mark:space ratio (%) | Comment |
|---|---|---|---|---|---|---|
| | 0 | 1 | 2 | 3 | | |
| 0 | 50% | 50% | 50% | 50% | 50:50 | Normal Operation |
| 1 | 90% | 90% | 90% | 90% | 90:10 | Limit of Normal Operation |
| 2 | 100% | 90% | 90% | 90% | 92.5:7.5 | Recovery mode |
| 3 | 100% | 90% | 100% | 90% | 95:5 | Recovery mode |
| 4 | 100% | 100% | 100% | 90% | 97.5:2.5 | Recovery mode |

ACCELEROMETERS

CROSS REFERENCE TO RELATED APPLICATIONS

This is a US National Stage of Application No. PCT/GB2015/050778, filed on Mar. 17, 2015, which claims the benefit of GB Application No. 1404720.3 filed Mar. 17, 2014, the disclosures of which are incorporated herein by reference.

TECHNICAL FIELD

The present disclosure relates to capacitive accelerometers, and in particular to methods for closed loop operation of capacitive accelerometers.

BACKGROUND

Accelerometers are electromechanical devices that are widely used to measure acceleration forces due to motion and/or vibration. Capacitive accelerometers may find use in applications including seismic sensing, vibration sensing, inertial sensing and tilt sensing. Capacitive accelerometers are typically implemented as micro electromechanical systems (MEMS) and maybe manufactured from a semiconductor material such as silicon. A typical MEMS sensing structure for a capacitive accelerometer comprises a proof mass moveably mounted to a support, with a set of electrode fingers extending from the proof mass being interdigitated with one or more sets of fixed electrode fingers so as to form a differential capacitor. The electrodes of the sensing structure are connected to suitable drive and pickoff electronics. In an open loop configuration, the electronics are arranged to drive the fixed electrode fingers with sine or square wave signals and the proof mass moves under acceleration to provide a pickoff signal that is a rectified voltage appearing on the output. WO 2004/076340 provides an example of an open loop accelerometer. However, open loop accelerometers can have limited performance in terms of bandwidth, linearity and dynamic range.

An accelerometer sensing structure designed for open loop operation can also be used in a closed loop configuration by using drive electronics to provide a variable electrostatic force to the electrodes to achieve force balancing. WO 2005/084351 provides an example of a closed loop electronic control circuit using pulse width modulation (PWM) of the drive signals. In such a closed loop configuration, the electronics are arranged to drive pairs of the fixed electrode fingers in anti-phase using PWM signals so that the proof mass is fixed in position by virtue of the electrostatic forces nulling the inertial force due to acceleration. The mark:space ratio of the PWM drive signals can be adjusted to produce a variable rebalance force. Some conventional closed loop accelerometers have used separate transducers for the forcing and sensing functions, i.e. separation in the time domain. In another approach, a combined PWM forcing and sensing system enables the position of the proof mass to be determined simultaneously with applying the rebalance forces, by separating the excitation and feedback signals in the frequency domain. For example, for a proof mass having a resonant frequency of around 1-3 kHz, the PWM drive signals may be at a frequency of around 100 kHz. Feedback from the pickoff circuit to the PWM drive signal generator causes the length of each PWM pulse to be changed as a function of the pickoff output voltage so as to provide an average electrostatic restoring force maintaining the proof mass at a central null position. In such a closed loop implementation, the condition of equal mark:space ratio i.e. 50:50 corresponds to zero net output force and the null position of the proof mass.

Under high g acceleration, the mark or the space will grow in length, depending on the sense of the acceleration. The range of the mark:space ratio is theoretically available in the range 0% to 100%. However, in practice, the mark:space ratio must always be in the range of typically 10% to 90% to give sufficient settling time for the sensing system to accurately determine the position of the proof mass, which is essential for performance. Thus the pulse width (or duty cycle) cannot span the full 0% to 100% range because of the need to preserve sensing function. This then limits the dynamic range of the rebalancing electrostatic forces that can be applied, which in turn limits the dynamic range over which closed loop operation can be achieved. The practical 10% to 90% range of a PWM-based closed loop system is equivalent to the full scale range of a sensor where 10% is full scale negative, 90% is full scale positive and 50% represents a critical 0 g (bias) condition. The resolution and accuracy of the PWM system within the 10% to 90% range is then determined by the maximum available clock frequency and becomes a limiting factor in setting the overall measurement range and accuracy of the system.

Another problem with operating in an "over range" condition below the 10% threshold or above the 90% threshold is that the electrode fingers of the proof mass will no longer be held in the null position as they are deflected close to the outer fixed electrodes—when this gap becomes small it can generate a large electrostatic force, since the electrostatic force varies with the inverse square of the gap. The proof mass can then "latch up" and can only be released by switching off the electronics and resetting the accelerometer. This is a fundamental drawback of analogue, or PWM, closed loop accelerometer systems. Although mechanical "bump stops" are normally included in the sensing structure to limit the displacement of the proof mass from extreme over range conditions, such bump stops are subject to manufacturing tolerances and are difficult to match exactly to the available PWM mark:space ratio range. This means that a latch-up condition may exist where the electrostatic force generated by the maximum pulse width (and large gap) can be exceeded by the electrostatic force generated by the minimum pulse width (and small gap), resulting in a latch-up condition e.g. if the bump stop size is inadequate or if the maximum g range of the device is greatly exceeded.

Of course the effective range of a closed loop accelerometer could always be increased so that high g accelerations previously considered an "over range" condition are now within the actual range of the accelerometer, but this is always at the expense of the low g performance unless a higher resolution PWM system can be produced. The PWM range, resolution and accuracy is therefore a limiting condition which cannot easily be overcome conventional means. There will always exist a maximum g level set by the voltage available and the electrode gaps. Thus for any sensing structure there will be the potential for an over range condition with the risk of latch up, e.g. depending on the bump stop gaps.

Where a closed loop accelerometer is operated within its normal g range and the mark:space ratio does not go beyond the upper and lower thresholds of the 10% to 90% range, then none of these problems may be encountered. However, it is often not possible to control the g forces experienced by an accelerometer during use. In real life, an acceleration larger than the dynamic range of the sensor may easily arise, at least temporarily, in extreme environments. For example, this could happen due to a shock in acceleration, which is often generated for a short period of time in a vehicle due to impacts from stones or closing of doors etc. In more extreme environments such as a rocket launcher, the accelerometer must be able to survive a high g for a limited period of time without latching up.

It would be desirable for a closed loop capacitive accelerometer to provide fault tolerance without its dynamic range being over-designed. The present disclosure seeks to reduce or overcome the disadvantages outlined above.

SUMMARY

According to a first aspect of this disclosure there is provided a method for closed loop operation of a capacitive accelerometer, the capacitive accelerometer comprising:
- a substantially planar proof mass mounted to a fixed substrate by flexible support legs so as to be linearly moveable in an in-plane sensing direction in response to an applied acceleration;
- first and second sets of moveable capacitive electrode fingers extending from the proof mass, substantially perpendicular to the sensing direction and spaced apart in the sensing direction; and
- first and second sets of fixed capacitive electrode fingers extending substantially perpendicular to the sensing direction and spaced apart in the sensing direction;
- wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;

the method comprising:
- applying an in-phase Pulse Width Modulation (PWM) drive signal to the first set of fixed capacitive electrode fingers and a corresponding anti-phase Pulse Width Modulation (PWM) drive signal to the second set of fixed capacitive electrode fingers;
- sensing a displacement of the proof mass and increasing or decreasing the mark length of each pulse in the PWM drive signals, thereby changing the mark:space ratio, to provide a net electrostatic restoring force on the proof mass that balances the inertial force of the applied acceleration and maintains the proof mass at a null position;
- detecting when the mark:space ratio required to maintain the proof mass at the null position is beyond a predetermined upper or lower threshold; and
- further modulating the PWM drive signals by extending or reducing x pulses in every y cycles, where x≥1 and y>1, so as to provide an average mark:space ratio beyond the upper or lower threshold without further increasing or decreasing the mark length of the other pulses.

In accordance with this disclosure it is detected when the mark:space ratio required to maintain the proof mass at the null position is beyond a predetermined upper or lower threshold i.e. a "over range" condition outside the normal dynamic range of the accelerometer. In order to be able to respond to high magnitude accelerations without further increasing or decreasing the mark length of all of the PWM pulses, which would otherwise degrade the accuracy of the sensing system, the PWM drive signals are further modulated by extending or reducing some but not all of the pulses. For example, extending or reducing at least one pulse in every other cycle, or less frequently. The result is an average mark:space ratio, averaged over a number of cycles, that is beyond the predetermined upper or lower threshold, while retaining a maximum and minimum mark length for the other pulses and thus retaining a settling time for the sensing system between at least some of the pulses.

In one example, the predetermined upper threshold may be about 90:10. In addition, or alternatively, the predetermined lower threshold may be about 10:90. Accordingly the accelerometer would normally have a dynamic range of 10-90% without the benefit of further modulation as disclosed herein. Of course the upper and/or lower threshold may be selected according to the normal operating range of any given accelerometer.

In examples of the disclosed method, extending x pulses in every y cycles may comprise extending the mark length of the x pulses beyond the upper threshold (e.g. 90%) to any length up to the full mark length corresponding to the signal cycle length. For instance, x pulses in every y cycles may have a mark length extended beyond 90% while the other pulses keep a mark length at the upper threshold of 90%. In a preferred set of examples, the mark length of the x pulses is extended to substantially 100%. In terms of sensing the displacement of the proof mass, this may be limited to those other cycles where the mark length of the pulses is not increased beyond the upper threshold e.g. 90%. Accordingly the method may comprise ignoring the sensing output for the x in every y cycles, i.e. sensing the displacement of the proof mass may be disregarded for the x in every y cycles.

In examples of the disclosed method, reducing x pulses in every y cycles may comprise reducing the mark length of the x pulses beyond the lower threshold (e.g. 10%) to any length down to zero. For instance, x pulses in every y cycles may have a mark length reduced to less than 10% while the other pulses keep a mark length at the upper threshold of 10%. In a preferred set of examples, the mark length of the x pulses is reduced to substantially 0%. In such examples, the method comprises omitting x pulses in every y cycles. In terms of sensing the displacement of the proof mass, this may be limited to those other cycles where the mark length of the pulses is not decreased beyond the lower threshold e.g. 10%. Accordingly the method may comprise ignoring the sensing output for the x in every y cycles, i.e. sensing the displacement of the proof mass may be disregarded for the x in every y cycles.

Further modulating the PWM drive signals may comprise extending or reducing e.g. omitting 1, 2 or 3 pulses in every 4 cycles, for example. Omitting (or extending) one pulse in every four cycles provides an average mark:space ratio of 7.5%:92.5% (or vice versa). In another example, omitting (or extending) one pulse in every two cycles, or two pulses in ever four cycles, provides an average mark:space ratio of 5%:95% (or 95%:5%). In another example, omitting (or extending) three pulses in ever four cycles provides an average mark:space ratio of 2.5%:97.5% (or vice versa). Of course, an even larger number of pulses could be omitted or extended, for example four pulses in every five cycles or nine pulses in every 10 cycles, but this could start to detrimentally affect the bandwidth and dynamic response of the accelerometer.

As is conventional, the PWM drive signals may be applied at a frequency that is separate from the resonant frequency range of the proof mass, for example around 100 kHz. For such drive signals the cycle length would be 10 microseconds and therefore the mark length of the pulses may vary between 1 and 9 microseconds for a 10% to 90% range.

In one set of examples, the method may provide a signal output representing the required electrostatic restoring force due to the displacement of the proof mass from the null position, which is proportional to the applied acceleration. This direct acceleration output may be taken from the amplitude of the PWM drive signals sensed due to displacement of the proof mass, e.g. suitably filtered. The same signal output may be used as an input when generating the PWM drive signals and adjusting the mark:space ratio to provide the required electrostatic restoring force that maintains the proof mass at a null position. In another set of examples, alternatively or in addition, the method may compare the in-phase and anti-phase PWM drive signals to produce a signal output representing the applied acceleration.

According to another aspect of this disclosure there is provided a capacitive accelerometer comprising:
 a substantially planar proof mass mounted to a fixed substrate by flexible support legs so as to be linearly moveable in an in-plane sensing direction in response to an applied acceleration;
 first and second sets of moveable capacitive electrode fingers extending from the proof mass, substantially perpendicular to the sensing direction and spaced apart in the sensing direction;
 first and second sets of fixed capacitive electrode fingers extending substantially perpendicular to the sensing direction and spaced apart in the sensing direction;
 wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
 a Pulse Width Modulation (PWM) drive signal generator arranged to apply an in-phase PWM drive signal to the first set of fixed capacitive electrode fingers and a corresponding anti-phase PWM drive signal to the second set of fixed capacitive electrode fingers;
 a circuit arranged to sense a displacement of the proof mass and a PWM mark:space ratio generator arranged to increase or decrease the mark length of each pulse in the PWM drive signals, thereby changing the mark:space ratio, to provide a net electrostatic restoring force on the proof mass that balances the inertial force of the applied acceleration and maintains the proof mass at a null position;
 a PWM mark:space ratio detector arranged to detect when the mark:space ratio required to maintain the proof mass at the null position is beyond a predetermined upper or lower threshold; and
 a modulator for the PWM drive signal generator arranged to extend or reduce x pulses in every y cycles, where x≥1 and y>1, so as to provide an average mark:space ratio beyond the upper or lower threshold without further increasing or decreasing the mark length of the other pulses.

As is discussed above, such an accelerometer additionally employs a PWM mark:space ratio detector to detect when the mark:space ratio required to maintain the proof mass at the null position is beyond a predetermined upper or lower threshold, and an additional modulator to act on the PWM drive signal generator so as to reduce or extend some (but not all) of the pulses. This can be used to provide a reduced or enlarged mark:space ratio, averaged over a number of cycles, without further decreasing or increasing the mark length of the other pulses and retaining a space of 10% or more between at least some of the pulses. As before, the predetermined upper threshold for the mark:space ratio may be about 90:10 and the predetermined lower threshold for the mark:space ratio may be about 10:90.

In examples of this disclosure, the modulator is arranged to extend the mark length of the x pulses beyond the upper threshold (e.g. 90%) to any length up to the full mark length corresponding to the signal cycle length. For instance, x pulses in every y cycles may have a mark length extended beyond 90% while the other pulses keep a mark length at the upper threshold of 90%. In one set of examples, the modulator is arranged to extend the mark length of the x pulses to substantially 100%. In terms of sensing the displacement of the proof mass, this may be limited to those other cycles where the mark length of the pulses is not increased beyond the upper threshold e.g. 90%. Accordingly the sensing circuit may be arranged to disregard its reading of the proof mass displacement for the x in every y cycles.

The modulator is arranged to reduce the mark length of the x pulses beyond the lower threshold (e.g. 10%) to any length down to zero. For instance, x pulses in every y cycles may have a mark length reduced to less than 10% while the other pulses keep a mark length at the upper threshold of 10%. In a preferred set of examples, the modulator is arranged to reduce the mark length of the x pulses to substantially 0%. In other words, the modulator may be arranged to omit x pulses in every y cycles. In terms of sensing the displacement of the proof mass, this may be limited to those other cycles where the mark length of the pulses is not decreased beyond the lower threshold e.g. 10%. Accordingly the sensing circuit may be arranged to disregard its reading of the proof mass displacement for the x in every y cycles.

The modulator may be arranged to reduce (e.g. omit) or extend a number of pulses in every y cycles. In various examples the modulator is arranged to reduce or extend one, two, or three pulses in every four cycles. However, it is possible that a larger number of pulses may be reduced or extended, for example four pulses in every five cycles or nine pulses in every 10 cycles, although in practice it is only required to reduce or extend the average mark:space ratio sufficiently to overcome the latch up condition described earlier.

The accelerometer may include one or more output signal circuits. In one example, an output signal circuit is arranged to produce an output the required electrostatic restoring force due to the displacement of the proof mass from the null position, which is proportional to the applied acceleration. This direct acceleration output may be taken from the amplitude of the PWM drive signals sensed due to displacement of the proof mass, e.g. suitably filtered. The same signal output may be used as an input to the PWM drive signal generator. In another alternative or additional example, an output signal circuit may include a comparator for the in-phase and anti-phase PWM drive signals arranged to produce an output representing the applied acceleration. For instance, the comparator may comprise a differential amplifier.

According to this disclosure the effective dynamic range of the accelerometer is extended in excess of its normal operating range, while preserving the full accuracy of the position sensing function and without compromising the resolution or low end performance. Additionally modulating the PWM drive signals by reducing or extending some pulses, e.g. with a duty cycle of 4:4, 3:4, 2:4 or 1:4 as appropriate, means that the performance of the accelerometer can be extended beyond the normal full scale 10% or 90% to an effective recovery mode extending close to 0% or 100% while retaining at least some pulse lengths within the normal upper/lower threshold so the pickoff output can still be measured reliably.

It will be appreciated that increasing or decreasing the average mark:space ratio beyond the predetermined upper or lower thresholds (e.g. 10% and 90%) may result in the proof mass being deflected further than normal during over range conditions. Mechanical bump stops may therefore be provided to limit over range movement of the proof mass. The accelerometer may further comprise bump stops defining a minimum gap between the interdigitated electrode fingers. This minimum gap may be chosen taking into account the additional modulation programmed to be applied to the PWM drive signals. Under high g, if the average mark:space ratio is extended to 2.5:97.5 (or vice versa) then the gap between the electrode fingers of the proof mass and the outer most fixed electrode fingers may become small enough to cause latch up, unless the bump stops define a minimum gap equivalent to the electrostatic forces normally experienced for a mark:space ratio of 10:90. The bump stops may be arranged to limit the electrostatic attractive force to less than the restoring force provided by the PWM drive signals. The size of the bump stops may therefore be chosen depending on the dynamic range of the accelerometer. In a particular set of examples, the PWM drive signals are modulated so that the electrostatic restoring forces on the proof mass are sufficient to overcome the latching electrostatic forces that would be produced when the proof mass is on its bump stops.

In any of the examples disclosed above, the first set of fixed capacitive electrode fingers may have a first offset in one direction from a median line between the interdigitated electrode fingers and the second set of fixed capacitive electrode fingers may have a second offset in the opposite direction from the median line.

In any examples of this disclosure, the proof mass and the fixed electrode fingers may be integrally formed from a semiconductor substrate, for example a silicon substrate. The capacitive accelerometer may take the form of a MEMS accelerometer.

The flexible support legs that mount the proof mass to the fixed substrate may be attached to anchors provided by the fixed substrate. The anchors may be fixedly bonded, e.g. anodically bonded, to an underlying electrically insulating support (for example glass). The flexible support legs set the resonance frequency of the proof mass and hence the sensitivity of the accelerometer. The proof mass may be mounted by a plurality of equally spaced flexible support legs, for example two or four support legs arranged around the proof mass. Where the proof mass takes the form of a substantially rectangular frame, the flexible support legs may be arranged at the four corners of the frame. Each support leg may extend in a direction substantially perpendicular to the sensing direction of the accelerometer so that when the proof mass moves in response to an applied acceleration the support legs flex and apply a restoring force urging the proof mass back towards a rest position.

The shorter the support legs, the higher the resonance frequency of the proof mass. It may be desirable to reduce the resonance frequency without significantly increasing the overall dimensions of the device. In a set of examples, the support legs have a serpentine form. Each support leg may comprise at least a first generally straight section, a second generally straight section, and an end section of generally U-shaped form interconnecting the first and second generally straight sections, wherein the thickness of the end section is greater than the thickness of a central part of both of the first and second generally straight sections. This construction of the support legs represents a serpentine form with increased thickness for the end sections, which are most highly stressed in the event of a significant out-of-plane acceleration being applied. The support legs may have a serpentine form substantially as described in WO 2013/050752, the contents of which are hereby incorporated fully by reference.

The accelerometer may comprise any suitable gaseous medium to provide a damping effect for the interdigitated capacitive electrode fingers. The gaseous medium may comprise one or more of air, nitrogen, argon, helium or neon. The gaseous medium may be contained at atmospheric pressure or at an elevated pressure. For example, the gaseous medium may be contained at a pressure up to about 10 bar.

BRIEF DESCRIPTION OF DRAWINGS

One or more non-limiting examples will now be described, with reference to the accompanying drawings, in which:

FIGS. 1a and 1b each show a prior art form of accelerometer;

FIG. 2 is a block diagram of a closed loop electronic control circuit for the prior art accelerometer according to FIG. 1a;

FIG. 1a shows a prior art form of capacitive accelerometer 101 similar to that seen in WO 2005/083451, the contents of which are hereby incorporated by reference. The accelerometer 101 has a proof mass 102 and four fixed electrodes arranged in two pairs 104, 106 on either side of the proof mass 102. The proof mass 102 is connected to multiple sets of moveable electrode fingers 108. These electrode fingers 108 are interdigitated in an offset manner with corresponding sets of fixed electrode fingers 110, 112 extending from the fixed electrodes 104, 106. The proof mass 102 also has a set of flexible support legs 114, which extend from the body of the proof mass 102 and are fixed at anchor points 116. The proof mass 102 can move relative to the fixed electrodes 104, 106 in an in-plane sensing direction (indicated by the double headed arrow) in response to an applied acceleration. The two sets of fixed electrode fingers 110, 112 are offset from the proof mass fingers 108 in opposite directions along the sensing direction, such that a movement in either direction can be measured.

Figure 1B:
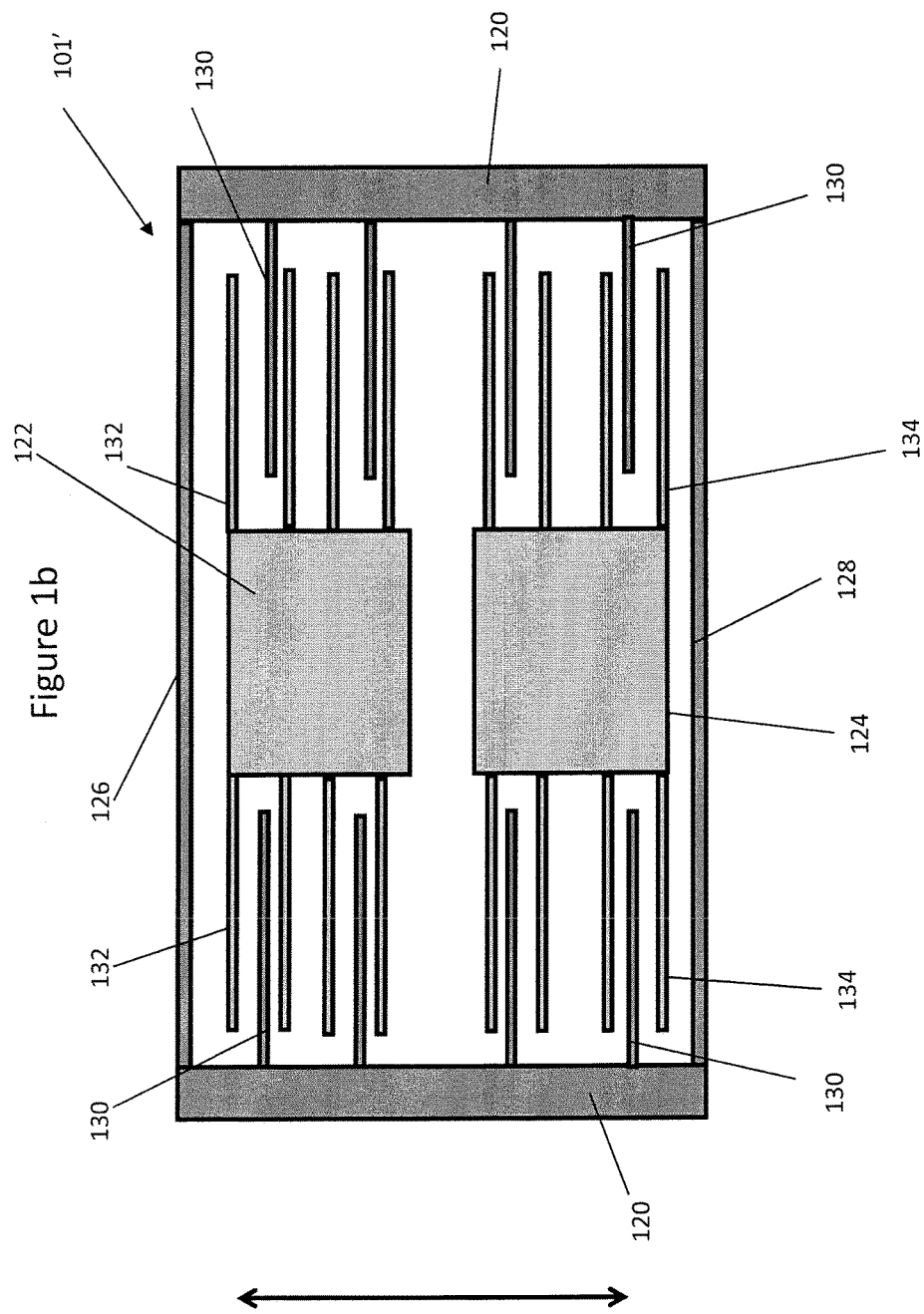

During use of the accelerometer 101, an applied acceleration will cause the proof mass 102 and its electrode fingers 108 to move in the sensing direction relative to the fixed electrodes 104, 106. In open loop operation, this causes a change in the offset between the proof mass fingers 108 and the fixed electrode fingers 110, 112. This displacement can be directly measured to calculate the acceleration, as it causes a change in the differential capacitance between the electrodes. In a closed loop system, the fingers do not actually move relative to one another. The feedback voltage applied to the fixed fingers 104, 106 creates an electrostatic restoring force on the moveable fingers 108 so that under acceleration the proof mass 102 does not move, with its inertial forces being balanced by electrostatic forces.

FIG. 1b shows an alternative form of prior art accelerometer 101' which is similar to that seen in WO 2012/076837, the contents of which are hereby incorporated by reference. In this accelerometer 101' the proof mass 120 takes the form of an outer frame, with the fixed electrodes 122, 124 being arranged internal to the frame. This is a reversal of the arrangement of FIG. 1a. The proof mass frame 120 is anchored at two central points 126, 128, above and below the fixed electrodes 122, 124. Extending from the frame 120 are a number of moveable electrode fingers 130, which are interdigitated with fixed electrode fingers 132, 134 extending from the fixed electrodes 122, 124 in an offset manner. As in FIG. 1a, electrode fingers 130, 132, 134 are spaced apart with an offset parallel to the sensing direction (shown by the double headed arrow), by approximately the same distance but in opposite directions. This form of prior art accelerometer can be operated in a similar manner to that of FIG. 1a, as will be described in more detail below.

Figure 2:
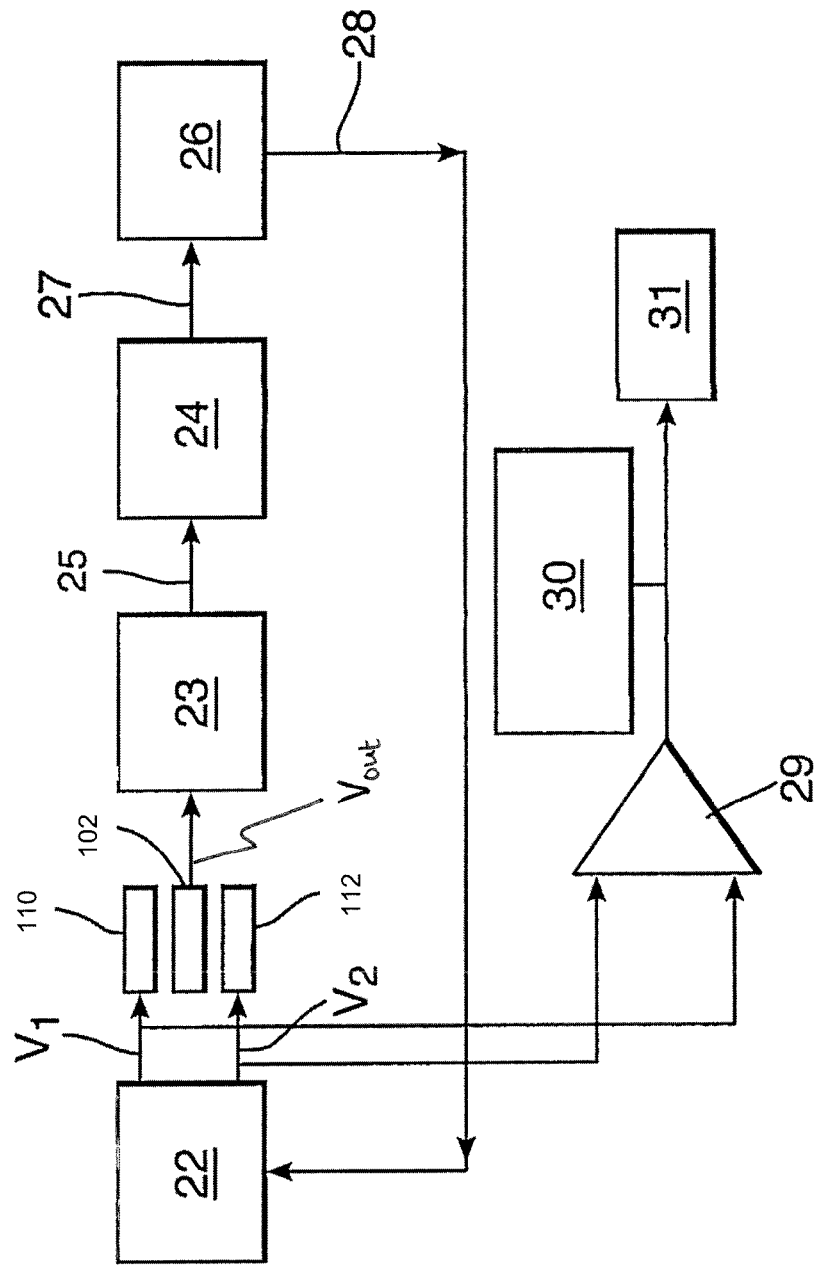

As is seen from FIG. 2, in a closed loop control configuration of the accelerometer 101 (or 101') the fixed fingers 110, 112 can be controlled using a pulse width modulation (PWM) technique, in which an in-phase PWM signal $V_1$ is applied to one set of fingers 110, and an anti-phase PWM signal $V_2$ is applied to the other set of fingers 112. A PWM drive signal generator 22 supplies the complementary in-phase and anti-phase drive voltages $V_1$ and $V_2$ to the respective electrode fingers 110, 112. An output voltage signal $V_{out}$ from the proof mass 102 is taken to a pre-amp 23. A demodulator 24 receives and demodulates an output 25 from the pre-amp 23 to provide an output 27 representing the displacement of the proof mass from the null position. An integrator/loop filter 26 receives, integrates and filters the output 27 from the demodulator 24. The resultant feedback signal 28 represents the required restoring force due to the displacement of the proof mass from the null position and is therefore proportional to the applied acceleration. The signal 28 is input to the PWM generator 22 to set the mark:space ratio of the PWM drive voltages $V_1$ and $V_2$. The generator 22 is arranged to increase or decrease the mark length of the PWM pulses and thereby change the mark:space ratio to provide the required restoring force on the proof mass. When the proof mass 102 tends to move under the inertial force of an applied acceleration, the PWM voltage signals $V_1$ and $V_2$ applied to the fixed electrodes 110, 112 provide a capacitive force feedback to null the proof mass 102 and therefore allow an indirect measurement of the acceleration. A differential amplifier 29 with a low pass filter 30 is provided to compare the drive voltages $V_1$ and $V_2$ and provide an output at 31. Alternatively the PWM feedback signal 28 can be used as a direct output representing the applied acceleration, providing the generator 22 has sufficient accuracy.

Figure 3:
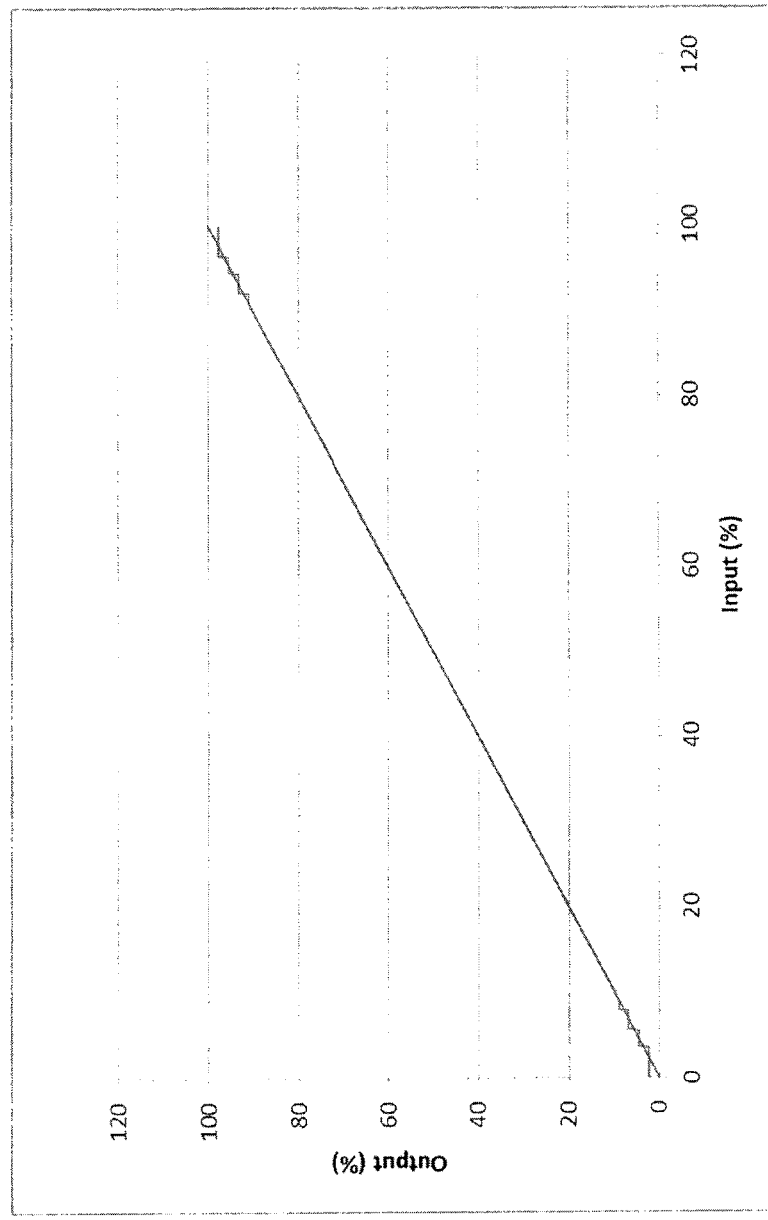
FIG. 3 depicts the dynamic range of the closed loop control according to FIG. 2.

When using such a PWM approach, the electrostatic restoring force is proportional to the mark:space ratio, which gives a linear output across the sensor's operational range. The size of the restoring force required to maintain the fingers in a fixed position can be used to calculate the force on the proof mass 102, and therefore the applied acceleration along the sensing direction of the accelerometer 101. However, it can be seen from FIG. 3 that the average output of the accelerometer becomes non-linear when the input acceleration extends into the "over range" beyond the normal 10-90% range. If the accelerometer is exposed to an over range acceleration, albeit only briefly, then the instantaneous measurement accuracy is lost. Furthermore, mechanical bump stops must be relied upon to limit the over range displacement of the proof mass and avoid latch-up.

Figure 4:
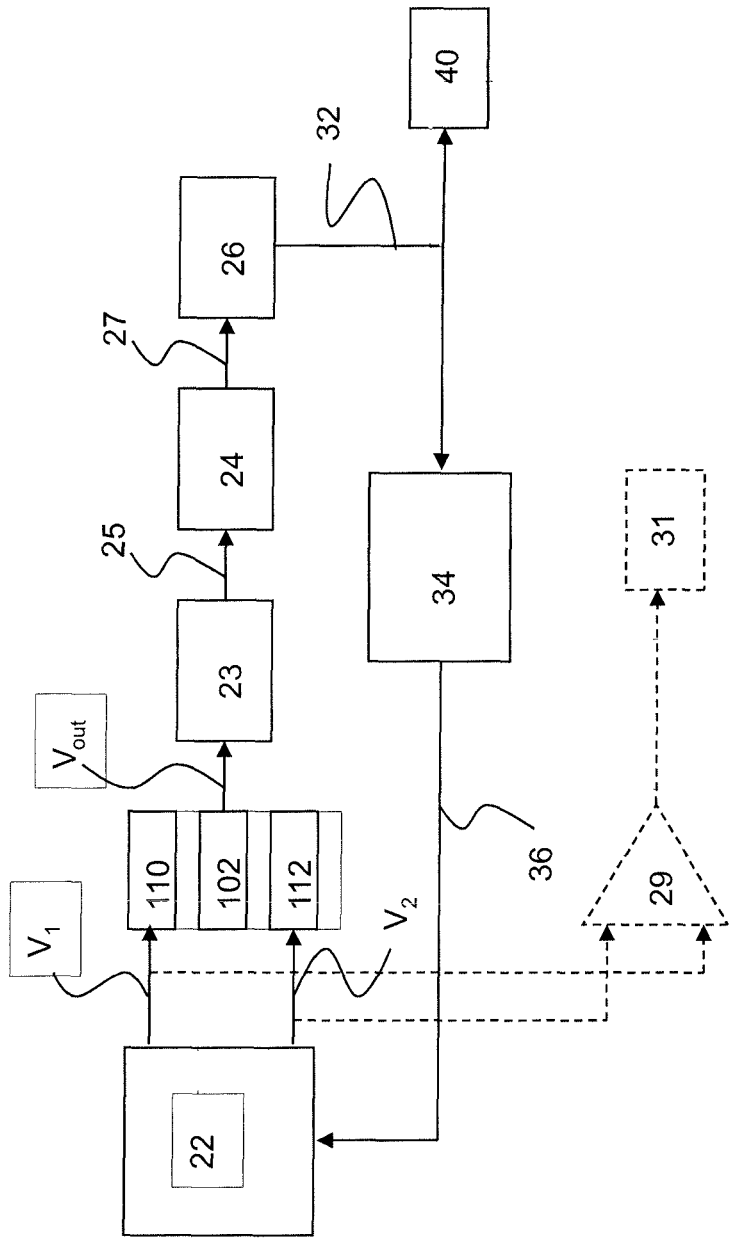
FIG. 4 is a block diagram of an exemplary closed loop electronic control circuit for an accelerometer in accordance with this disclosure.

There is seen in FIG. 4 a closed loop electronic circuit in accordance with an example of the present disclosure. As before, a PWM drive voltage generator 22 provides in-phase and anti-phase voltage signals $V_1$ and $V_2$ to first and second sets of fixed electrodes 110, 112, respectively. An output voltage $V_{out}$ from the proof mass 102 is provided to a pre-amp 23 and its output 25 is provided to a demodulator 24. The resultant output 27 represents the displacement of the proof mass from the null position. The output 27 then passes through an integrator/loop filter 26 to provide an output 32 representing the required restoring force due to the displacement of the proof mass from the null position i.e. proportional to the applied acceleration. The output 32 is used as an input to a PWM drive voltage control circuit. Unlike the closed loop control seen in FIG. 2, the integrated and filtered output 32 is not used to directly drive the PWM signal generator 22, but instead passes to a control 34 comprising a PWM mark:space ratio detector and modulator. The control 34 detects when the acceleration corresponds to an over-range condition and the mark:space ratio required to maintain the proof mass 102 at its null position would be beyond the normal upper (e.g. 90%) or lower (e.g. 10%) threshold of the dynamic range. When an over-range condition is detected, a modulated PWM drive signal 36 is fed from the control 34 to the generator 22 so that some of the PWM pulses are reduced or extended in length without further increasing or decreasing the mark length of the other pulses. For example, the PWM drive signals of $V_1$ and $V_2$ may be modulated between the normal full scale threshold (lower 10% or upper 90%) and the 0% or 100% recovery level by omitting some of the pulses with a duty cycle of e.g. 4:4, 3:4, 2:4 or 1:4 as appropriate. This can be understood with reference to FIGS. 5 and 6.

Figure 5:
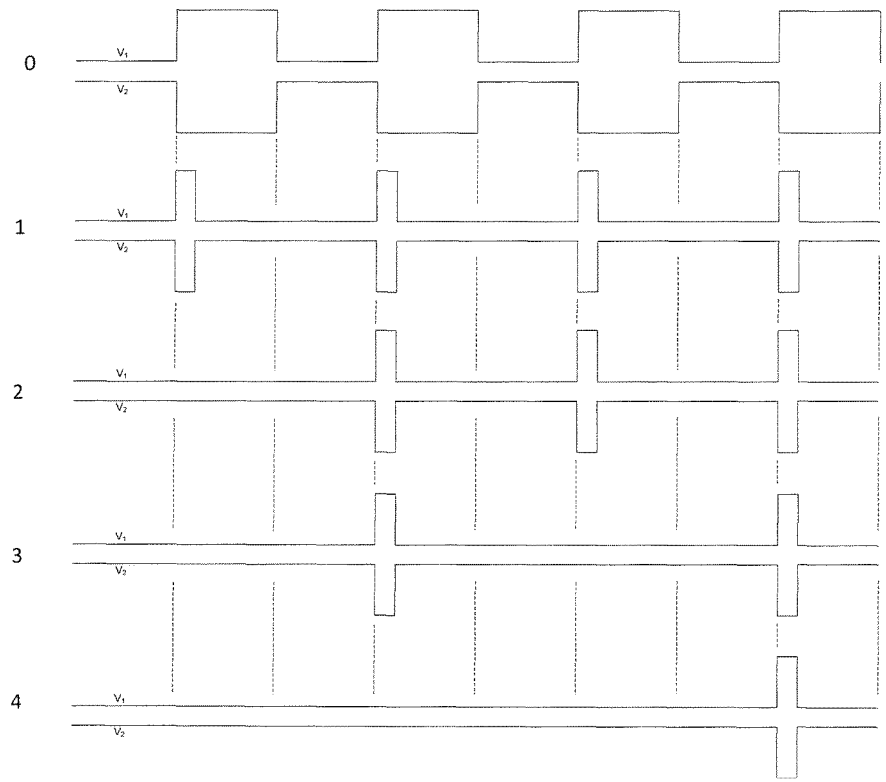
FIG. 5 shows how over range recovery is achieved for a PWM mark:space ratio limit condition of 10:90.
Figure 6:
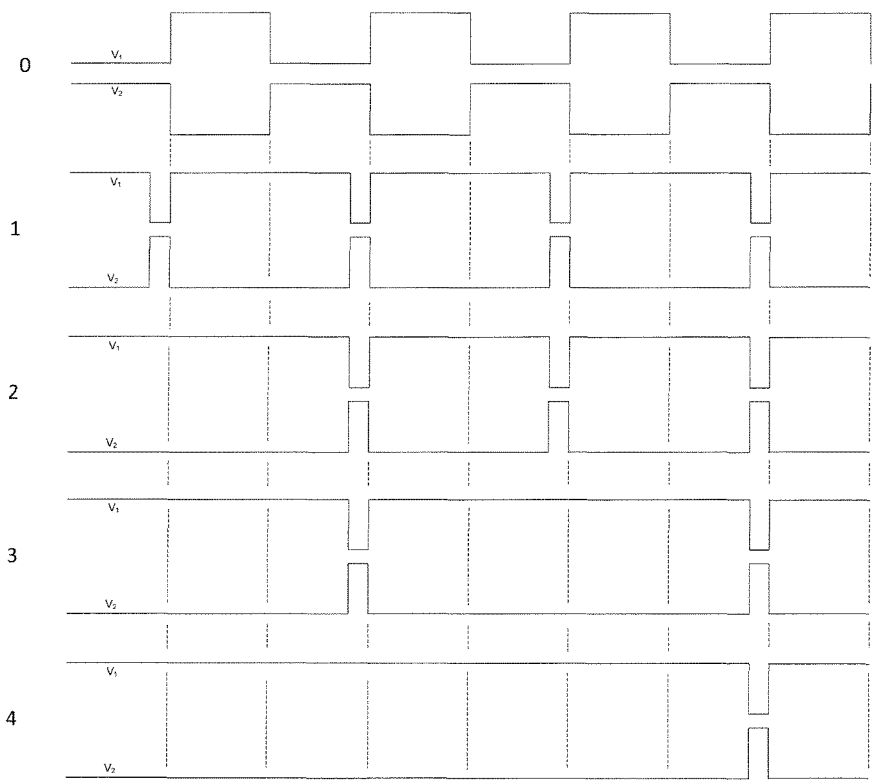
FIG. 6 shows how over range recovery is achieved for a PWM mark:space ratio limit condition of 90:10.

Normal operation of the accelerometer is represented by over-range state zero, shown in this example as a drive voltage having a PWM mark:space ratio of 50:50. Of course, the PWM mark length may be adjusted anywhere between 10% and 90% in response to the output voltage $V_{out}$ from the proof mass 102. In FIG. 5, over-range stage 1 corresponds to the lower threshold of a 10:90 mark:space ratio. It is not desirable to reduce the PWM mark length any further, in order to provide sufficient settling time for the sensing system to accurately determine the position of the proof mass between pulses. When the control 34 recognises that the applied acceleration is resulting in an over-range condition, the control circuit provides a recovery mode in which at least one pulse is omitted during every four cycles. For example, in over-range state 2, one pulse is omitted in every four, resulting in an average mark:space ratio of 7.5:92.5. In over-range state 3, alternate pulses having a mark length of 10% are omitted so as to provide an average mark:space ratio of 5:95. In over-range state 4, three in every four pulses are omitted so as to reduce the average mark:space ratio down to 2.5:97.5. FIG. 6 shows the corresponding over-range states and recovery modes when the applied acceleration would require a mark:space ratio to go beyond the upper threshold of 90%. Over-range state 1 corresponds to the upper limit of normal operation, where every pulse has a mark length of 90%. In over-range state 2, one pulse in every four is extended to 100% mark length so as to provide an average mark:space ratio of 92.5:7.5. In over-range state 3, every other pulse is extended to 100% so as to provide an average mark:space ratio of 95:5. In over-range state 4, three of every four pulses are extended to 100% mark length so as to provide a recovery mode in which the average mark:space ratio is 97.5:2.5.

It will be appreciated that FIGS. 5 and 6 do not provide exhaustive examples of over-range recovery modes, and any suitable number of PWM pulses may be reduced or extended in length, or omitted, so as to achieve a desired result for the average mark:space ratio. However, increasing the number of pulses that are increased (e.g. to 100%) or decreased (e.g. to 0%) in length may reduce the number of cycles in which the PWM drive signal is within the normal thresholds and the sensing function can be accurately maintained.

A PWM scheme in closed loop operation enables both drive and pickoff signals to be produced without requiring separate transducers to be connected to the sensing structure. The amplitude of the PWM drive signals ($V_1$ and $V_2$) provides a constant amplitude excitation voltage for the proof mass and the pickoff signal ($V_{out}$), which measures the required restoring force due to the displacement of the proof mass from the null position, then has a gain set by the amplitude of the PWM drive signals. The PWM mark:space ratio determines the restoring force and is proportional to the applied acceleration. Returning to FIG. 4, it may be seen that two alternative output stages are available. One option is for the integrator/loop filter 26 to directly provide the suitably filtered signal 32, which is proportional to the applied acceleration, at an output 40. This is a digital signal so can be used without introducing additional errors. Alternatively, or in addition, a comparator such as a differential amplifier 29 may compare the PWM drive voltages $V_1$ and $V_2$ to measure the restoring force and thus provide an output at 31 proportional to the applied acceleration. This signal 31 is an analogue signal that can be filtered or digitised as appropriate to match the requirements of the system. This may offer a higher performance system, as errors within the generator 22 or control 34 will be suppressed by the closed loop operation.

The accelerometers described above may include mechanical bump stops defining a minimum gap between the interdigitated electrode fingers. In order to avoid latch up problems, e.g. resulting from high-g shocks during use, the PWM drive signals $V_1$ and $V_2$ are modulated so that the electrostatic restoring forces on the proof mass are sufficient to overcome the latching electrostatic forces that would be produced when the proof mass is on its bump stops.

The invention claimed is:

1. A method for closed loop operation of a capacitive accelerometer,
   the capacitive accelerometer comprising:
   a substantially planar proof mass mounted to a fixed substrate by flexible support legs so as to be linearly moveable in an in-plane sensing direction in response to an applied acceleration;
   first and second sets of moveable capacitive electrode fingers extending from the proof mass, substantially perpendicular to the sensing direction and spaced apart in the sensing direction; and
   first and second sets of fixed capacitive electrode fingers extending substantially perpendicular to the sensing direction and spaced apart in the sensing direction;
   wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
   the method comprising:
   applying an in-phase Pulse Width Modulation (PWM) drive signal to the first set of fixed capacitive electrode fingers and a corresponding anti-phase Pulse Width Modulation (PWM) drive signal to the second set of fixed capacitive electrode fingers;
   sensing a displacement of the proof mass and increasing or decreasing the mark length of each pulse in the PWM drive signals, thereby changing the mark:space ratio, to provide a net electrostatic restoring force on the proof mass that balances the inertial force of the applied acceleration and maintains the proof mass at a null position;
   detecting when the mark:space ratio required to maintain the proof mass at the null position is beyond a predetermined upper or lower threshold; and
   further modulating the PWM drive signals by extending or reducing x pulses in every y cycles, where x≥1 and y>1, so as to provide an average mark:space ratio beyond the upper or lower threshold without further increasing or decreasing the mark length of the other pulses.

2. A method according to claim 1, wherein the predetermined upper threshold is about 90:10 and/or the predetermined lower threshold is about 10:90.

3. A method according to claim 1, wherein extending x pulses in every y cycles comprises extending the mark length of the x pulses to substantially 100%.

4. A method according to claim 1, wherein reducing x pulses in every y cycles comprises reducing the mark length of the x pulses to substantially 0%.

5. A method according to claim 1 wherein further modulating the PWM drive signals comprises extending or reducing 1, 2, or 3 pulses in every 4 cycles.

6. A method according to claim 1, wherein sensing the displacement of the proof mass is disregarded for the x in every y cycles.

7. A method according to claim 1, further comprising providing a signal output (40) representing the required electrostatic restoring force due to the displacement of the proof mass from the null position.

8. A method according to claim 1, further comprising comparing the in-phase and anti-phase PWM drive signals to produce a signal output (30) representing the applied acceleration.

9. A capacitive accelerometer comprising:
   a substantially planar proof mass mounted to a fixed substrate by flexible support legs so as to be linearly moveable in an in-plane sensing direction in response to an applied acceleration;
   first and second sets of moveable capacitive electrode fingers extending from the proof mass, substantially perpendicular to the sensing direction and spaced apart in the sensing direction;
   first and second sets of fixed capacitive electrode fingers extending substantially perpendicular to the sensing direction and spaced apart in the sensing direction;
   wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
   a Pulse Width Modulation (PWM) drive signal generator arranged to apply an in-phase PWM drive signal to the first set of fixed capacitive electrode fingers and a corresponding anti-phase PWM drive signal to the second set of fixed capacitive electrode fingers;

a circuit arranged to sense a displacement of the proof mass and a PWM mark:space ratio generator arranged to increase or decrease the mark length of each pulse in the PWM drive signals, thereby changing the mark:space ratio, to provide a net electrostatic restoring force on the proof mass that balances the inertial force of the applied acceleration and maintains the proof mass at a null position;

a PWM mark:space ratio detector arranged to detect when the mark:space ratio required to maintain the proof mass at the null position is beyond a predetermined upper or lower threshold; and a modulator for the PWM drive signal generator arranged to extend or reduce x pulses in every y cycles, where x≥1 and y>1, so as to provide an average mark:space ratio beyond the upper or lower threshold without further increasing or decreasing the mark length of the other pulses.

10. An accelerometer according to claim 9, wherein the predetermined upper threshold is about 90:10 and/or the predetermined lower threshold is about 10:90.

11. An accelerometer according to claim 9, wherein the modulator is arranged to extend the mark length of the x pulses to substantially 100%.

12. An accelerometer according to claim 9, wherein the modulator is arranged to reduce the mark length of the x pulses to substantially 0%.

13. An accelerometer according to claim 9, wherein the modulator is arranged to extend or reduce 1, 2, or 3 pulses in every 4 cycles.

14. An accelerometer according to claim 9, further comprising at least one of: (i) an output signal circuit producing an output (40) representing the required electrostatic restoring force due to the displacement of the proof mass from the null position; and (ii) an output signal circuit including a comparator for the in-phase and anti-phase PWM drive signals producing an output (30) representing the applied acceleration.

15. An accelerometer according to claim 9, further comprising bump stops defining a minimum gap between the interdigitated electrode fingers.

* * * * *